G. C. RASCH.
FASTENING.
APPLICATION FILED JAN. 15, 1909.

1,042,601.

Patented Oct. 29, 1912.

Witnesses:
Fred Palm
Chas. L. Goss.

Inventor:
Gustave C. Rasch,
By Winkler Flanders Bottum & Fawsett
Attorneys.

UNITED STATES PATENT OFFICE.

GUSTAVE C. RASCH, OF BURLINGTON, WISCONSIN.

FASTENING.

1,042,601.   Specification of Letters Patent.   Patented Oct. 29, 1912.

Application filed January 15, 1909. Serial No. 472,420.

*To all whom it may concern:*

Be it known that I, GUSTAVE C. RASCH, a citizen of the United States, residing at Burlington, in the county of Racine and State of Wisconsin, have invented certain new and useful Improvements in Fastenings, of which the following is a specification, reference being had to the accompanying drawing, forming a part thereof.

This invention relates more particularly to fastenings for horse blankets and the like. Its main objects are to provide a fastening of simple construction which can be easily applied to blankets and the like, and which can be easily and quickly coupled and uncoupled by hand but will not readily uncouple accidentally, and generally to improve the construction and operation of devices of this class.

It consists in the construction, arrangement and combination of parts as hereinafter particularly described and defined in the claims.

In the accompanying drawing like characters designate the same parts in the several figures.

Figure 1:
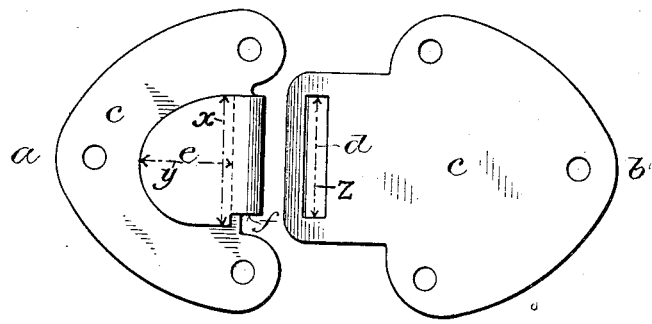
Figure 2:
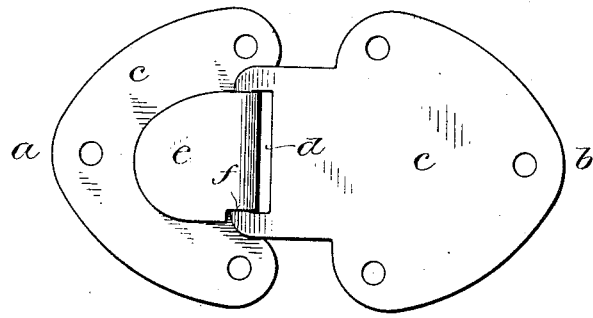
Figure 3:
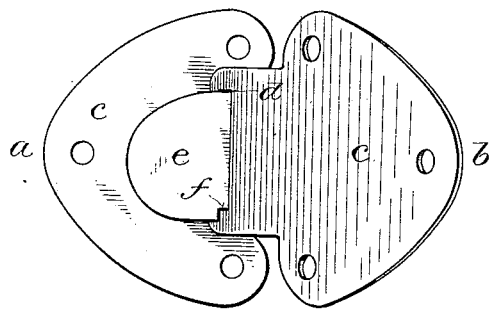
Figure 5:
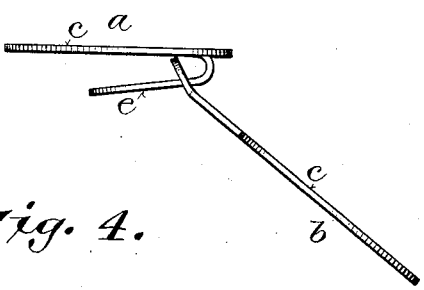
Figure 4:
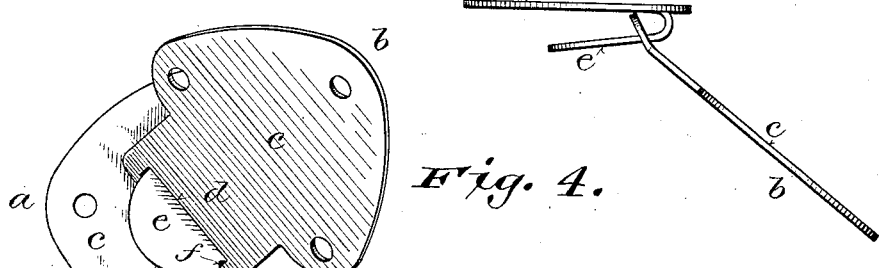

Figure 1 is a face or front view showing the members of the fastening detached; Fig. 2 is a similar view showing the members coupled together; Fig. 3 is a similar view showing the eye member turned outwardly at an angle to the plane of the hook member as in the act of uncoupling or coupling; Fig. 4 is a similar view showing the eye member turned edgewise in the notch of the hook member in the act of coupling or uncoupling; and Fig. 5 is a top edge view of the members in positions relative to each other corresponding with those shown by Fig. 3.

The coupling comprises two members, a hook member $a$ and an eye member $b$, which are preferably made as shown, each from a single piece of sheet metal. Each of the members is formed with a flat laterally extended attachment plate $c$, which may be conveniently made of approximately heart shape, as shown, with holes for riveting it to a blanket or the like. The eye member $b$ has a comparatively narrow transverse slot $d$, formed in an extension on one side thereof, preferably of somewhat less width than the plate $c$. The side or edge of this extension with which the hook is engaged, is preferably bent slightly inward, as shown in Fig. 5, to facilitate coupling and uncoupling the fastening. The other member is formed on the wider edge of its attachment plate $c$ with a hook $e$, having a notch $f$ in one edge around its bend or shank, which is approximately equal in width to the length of the slot $d$, so that when the members are coupled, as shown in Fig. 2, the shank will have very little play edgewise. The nose of the hook is rounded, and beyond or outside of the notch $f$ is of greater width (indicated by the dotted line $x$, Fig. 1,) and of somewhat less length (indicated by the dotted line $y$, Fig. 1) than the length (indicated by the dotted line $z$, Fig. 1) of the slot $d$, so that in coupling and uncoupling, one member, as for example the eye member $b$, has to be turned flatwise away from the plane of the other member, as shown in Figs. 3 and 5, so as to pass over the bend of the hook, and then has to be turned edgewise with one end of the slot $d$ held in the notch $f$, as shown in Fig. 4, so as to engage it or disengage it with the hook in coupling or uncoupling.

The peculiar construction of the members of the coupling as shown and described, whereby the two movements of one member relative to the other as above stated, are required to uncouple as well as to couple the fastening, render it practically impossible to accidentally disengage the members in the ordinary use of the fastening.

Various changes in details of construction may be made without departing from the principle and scope of the invention.

I claim:

1. In a fastening, the combination of two members, one having a transverse slot and the other a hook with a notch in one edge around the bend, the width of the hook-shank and the length of the slot being parallel with each other, the shank of the hook around the bend along the whole length of the notch being of approximately the same width as the length of the slot and the nose of the hook projecting laterally beyond the neck on one side only and being of greater width adjacent and outside the notch and of somewhat less length outside the notch than the length of said slot.

2. In a fastening, the combination of two sheet metal members formed integrally with laterally extended attachment plates, one member having a transverse slot adjacent to one edge which is bent slightly inward and the other member a hook with a notch in one edge around the bend, the width of the hook-shank and the length of the slot being parallel with each other, the shank of the hook being of about the same width as the length of the slot into which it fits and the nose being rounded and of greater width adjacent and outside the notch and of less length outside the notch than the length of the slot.

In witness whereof I hereto affix my signature in presence of two witnesses.

GUSTAVE C. RASCH.

Witnesses:
PEARL G. OWEN,
J. M. SCHROEDER.

Copies of this patent may be obtained for five cents each, by addressing the "Commissioner of Patents, Washington, D. C."